United States Patent
Seo et al.

(10) Patent No.: US 9,664,915 B2
(45) Date of Patent: May 30, 2017

(54) DISPLAY DEVICE

(71) Applicant: SAMSUNG DISPLAY CO., LTD., Yongin, Gyeonggi-Do (KR)

(72) Inventors: Hyunseung Seo, Anyang-si (KR); Seung Jun Jeong, Hwaseong-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 32 days.

(21) Appl. No.: 14/449,695

(22) Filed: Aug. 1, 2014

(65) Prior Publication Data

US 2015/0146118 A1    May 28, 2015

(30) Foreign Application Priority Data

Nov. 28, 2013    (KR) .......................... 10-2013-0146396

(51) Int. Cl.
| | | |
|---|---|---|
| *G02F 1/1335* | (2006.01) | |
| *G02F 1/13363* | (2006.01) | |
| *G02B 27/22* | (2006.01) | |

(52) U.S. Cl.
CPC .................. *G02B 27/2214* (2013.01)

(58) Field of Classification Search
CPC ... G02F 2001/133531; G02F 1/133528; G02F 2001/133541; G02F 1/13363; G02F 2001/133638; G02B 27/26; G02B 27/2214; H04N 13/0404
USPC .................................................... 349/98, 200
See application file for complete search history.

(56) References Cited

U.S. PATENT DOCUMENTS

| | | | |
|---|---|---|---|
| 7,250,923 B2 | 7/2007 | Taira et al. | |
| 7,787,008 B2* | 8/2010 | Fukushima | ........ G02B 27/2214 348/51 |
| 8,004,621 B2 | 8/2011 | Woodgate et al. | |
| 8,330,806 B2 | 12/2012 | Yun et al. | |
| 8,350,899 B2 | 1/2013 | Takahashi et al. | |
| 8,605,227 B2* | 12/2013 | Yoon | ........ G09G 3/003 349/15 |
| 2008/0225389 A1* | 9/2008 | Oh | ........ G02B 5/3058 359/485.05 |
| 2008/0252720 A1* | 10/2008 | Kim | ........ H04N 13/0404 348/59 |
| 2009/0109154 A1 | 4/2009 | Hong et al. | |
| 2009/0190048 A1* | 7/2009 | Hong | ........ G02B 27/2214 349/15 |

(Continued)

FOREIGN PATENT DOCUMENTS

| | | |
|---|---|---|
| KR | 1020110104701 | 9/2011 |
| KR | 1020130046116 | 5/2013 |
| KR | 1020130064333 | 6/2013 |

*Primary Examiner* — Paul Lee
*Assistant Examiner* — Jia Pan
(74) *Attorney, Agent, or Firm* — F. Chau & Associates, LLC

(57) ABSTRACT

A display device is provided. The display device includes a display panel generating an image, a phase retarder disposed on the display panel, a first polarizer disposed on the phase retarder, a liquid crystal lens disposed on the first polarizer, and a second polarizer disposed on the liquid crystal lens. The phase retarder has a first optical axis and the first polarizer has a second optical axis crossing the first optical axis. The second polarizer has a third optical axis substantially in parallel to the second optical axis.

7 Claims, 12 Drawing Sheets

(56) References Cited

U.S. PATENT DOCUMENTS

| | | | |
|---|---|---|---|
| 2011/0032438 A1* | 2/2011 | Yun | H04N 13/0415 349/15 |
| 2011/0043713 A1* | 2/2011 | Nam | G02B 27/26 349/15 |
| 2011/0157498 A1* | 6/2011 | Kim | G02F 1/134309 349/15 |
| 2011/0228181 A1* | 9/2011 | Jeong | G02B 5/1842 349/15 |
| 2012/0019733 A1* | 1/2012 | Kim | G02B 27/2214 349/15 |
| 2012/0105750 A1* | 5/2012 | Yoon | G09G 3/003 349/15 |
| 2012/0162550 A1* | 6/2012 | Jeong | H04N 13/0404 349/15 |
| 2012/0218497 A1* | 8/2012 | Kajita | G02F 1/134363 349/98 |
| 2012/0257127 A1 | 10/2012 | Miyazawa et al. | |
| 2012/0314144 A1 | 12/2012 | Sugita et al. | |
| 2013/0050594 A1 | 2/2013 | Hirayama et al. | |
| 2013/0093968 A1 | 4/2013 | Yanai | |
| 2013/0107174 A1* | 5/2013 | Yun | G02F 1/133526 349/96 |
| 2013/0135545 A1 | 5/2013 | Jung et al. | |
| 2013/0257828 A1* | 10/2013 | Azuma | G02F 1/29 345/204 |

* cited by examiner

FIG. 10
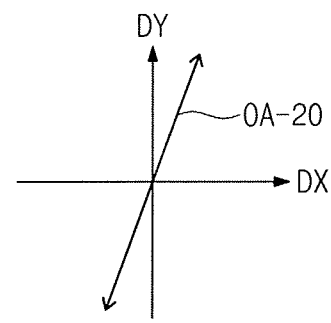
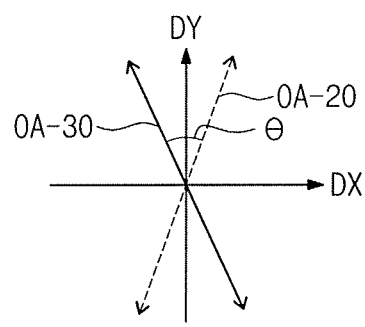
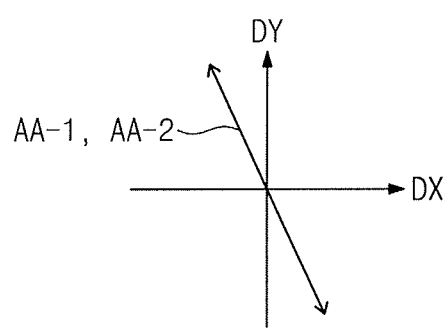
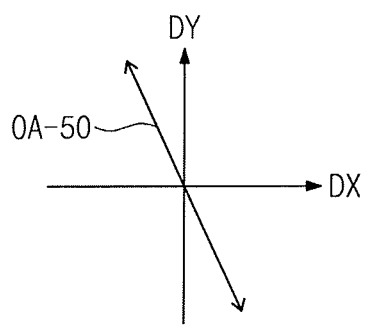

FIG. 13
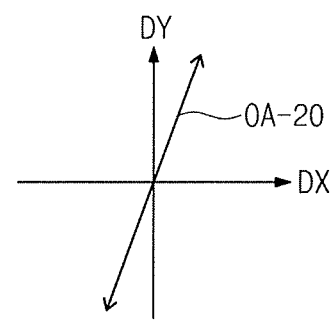
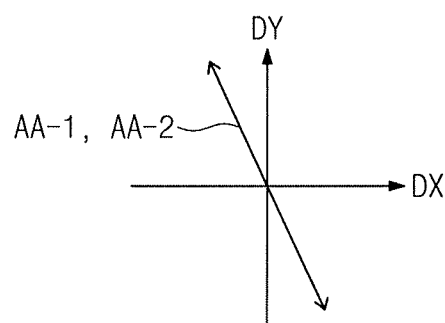
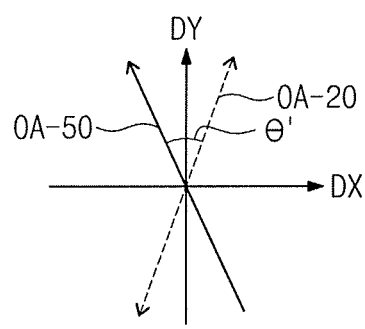

DISPLAY DEVICE

CROSS-REFERENCE TO RELATED APPLICATION

This U.S. non-provisional patent application claims priority under 35 U.S.C. §119 to Korean Patent Application No. 10-2013-0146396, filed on Nov. 28, 2013 in the Korean Intellectual Property Office, the disclosure of which is incorporated by reference herein in its entirety.

TECHNICAL FIELD

The present inventive concept relates to a display device, and more particularly to a display device having improved optical efficiency.

DISCUSSION OF THE RELATED ART

A display device includes a display panel and various functional members. To display a three-dimensional (3D) image, the display device may include a liquid crystal lens.

The liquid crystal lens includes two groups of electrodes, which are spaced apart from each other, and a liquid crystal layer disposed between the electrodes. When an electric field is applied to the liquid crystal layer, liquid crystal molecules in the liquid crystal layer are realigned. The liquid crystal lens may serve as a lenticular lens or a switch Fresnel zone plate lens according to the realigned liquid crystal molecules.

SUMMARY

The present inventive concept provides a display device having increased brightness and visibility.

According to an exemplary embodiment of the present inventive concept, a display device is provided. The display device includes a display panel, a phase retarder, a first polarizer, a liquid crystal lens, and a second polarizer. The display panel is configured to generate an image. The phase retarder is disposed on the display panel. The first polarizer is disposed on the phase retarder. The liquid crystal lens is disposed on the first polarizer. The second polarizer is disposed on the liquid crystal lens. The phase retarder has a first optical axis and the first polarizer has a second optical axis crossing the first optical axis. The second polarizer has a third optical axis that is substantially parallel to the second optical axis.

The first optical axis and the second optical axis may form an included angle of about 45 degrees.

The display panel may include a display surface having a first direction and a second direction that is substantially perpendicular to the first direction. The liquid crystal lens may include a plurality of lens units each of which extends in a third direction crossing the first direction on the display surface.

The display panel may include a plurality of pixel columns extending in the first direction and arranged in the second direction. Each of the pixel columns may include a plurality of pixels arranged in the first direction. Each of the pixels may include an organic light emitting diode.

Each of the lens units may include a plurality of first electrodes, a second electrode, and a liquid crystal layer. The first electrodes may be disposed on a first substrate and may extend in the third direction. The second electrode may be disposed on a second substrate and may be spaced apart from the first electrodes. The liquid crystal layer may be disposed between the first electrodes and the second electrode. The liquid crystal layer may be aligned along a first alignment axis of the first electrodes and a second alignment axis of the second electrode. The second alignment axis may be substantially parallel to the first alignment axis.

The first alignment axis may be substantially parallel to the third optical axis. The first alignment axis may be substantially parallel to the third direction in which the first electrodes extend. According to an exemplary embodiment of the present inventive concept, a display device is provided. The display device includes a display panel, a phase retarder, a liquid crystal lens, and a polarizer. The display panel is configured to generate an image. The phase retarder is disposed on the display panel and has a first optical axis. The liquid crystal lens is disposed on the phase retarder. The polarizer is disposed on the liquid crystal lens and has a second optical axis crossing the first optical axis.

The liquid crystal lens may include a plurality of electrodes that is substantially parallel to the second optical axis.

According to an exemplary embodiment of the present inventive concept, a display device is provided. The display device includes a display panel, a phase retarder, a liquid crystal lens, and a first polarizer. The display panel is configured to generate a two-dimensional (2D) image in a 2D mode and a three-dimensional (3D) image in a 3D mode. The phase retarder is disposed on the display panel and has a first optical axis. The liquid crystal lens is disposed on the phase retarder to provide the 3D image to a first focal point and a second focal point different from the first focal point in the 3D mode. The first polarizer is disposed on the liquid crystal lens and has a second optical axis crossing the first optical axis.

The display device may further include a second polarizer. The second polarizer is disposed between the phase retarder and the liquid crystal lens, and has a third optical axis that is substantially parallel to the second optical axis.

The display device may further include a distance control layer disposed between the display panel and the liquid crystal lens to control a distance between the display panel and the liquid crystal lens.

According to an exemplary embodiment of the present inventive concept, a display device is provided. The display device includes a display panel, a quarter wavelength plate, a first polarizer, a distance control layer, a liquid crystal lens, and a second polarizer. The display panel is configured to generate an image. The quarter wavelength is disposed on the display panel and has a first optical axis. The distance control layer is disposed on the first polarizer and is configured to control a focal length between a plurality of lens units in a liquid crystal lens and a plurality of pixel columns in the display panel. The liquid crystal lens is disposed on the distance control layer. The second polarizer is disposed on the liquid crystal lens and has a third optical axis that is substantially parallel to the second optical axis. At least one of the lens units includes a plurality of first electrodes, a second electrode, and a liquid crystal layer. The first electrodes are disposed on a first substrate. The second electrode is disposed on a second substrate spaced apart from the first substrate. The liquid crystal layer is disposed between the first electrodes and the second electrode. The liquid crystal layer is aligned along a first alignment axis of the first electrodes and a second alignment axis of the second electrode. The second alignment axis is substantially parallel to the first alignment axis.

BRIEF DESCRIPTION OF THE DRAWINGS

The above and other features of the present inventive concept will become more apparent by describing in detail exemplary embodiments thereof with reference to the accompanying drawings wherein:

FIG. 10 is a view showing optical axes of a display device according to an exemplary embodiment of the present inventive concept;

FIG. 13 is a view showing optical axes of a display device according to an exemplary embodiment of the present inventive concept.

DETAILED DESCRIPTION OF THE EMBODIMENTS

It will be understood that when an element or layer is referred to as being "on", "connected to" or "coupled to" another element or layer, it can be directly on, connected or coupled to the other element or layer or intervening elements or layers may be present. Like numbers may refer to like elements throughout the specification and drawings. As used herein, the term "and/or" includes any and all combinations of one or more of the associated listed items.

Hereinafter, exemplary embodiments of the present inventive concept will be described in detail with reference to the accompanying drawings. The present inventive concept may, however, be embodied in many different forms and should not be construed as being limited to the embodiments set forth herein.

Figure 1:
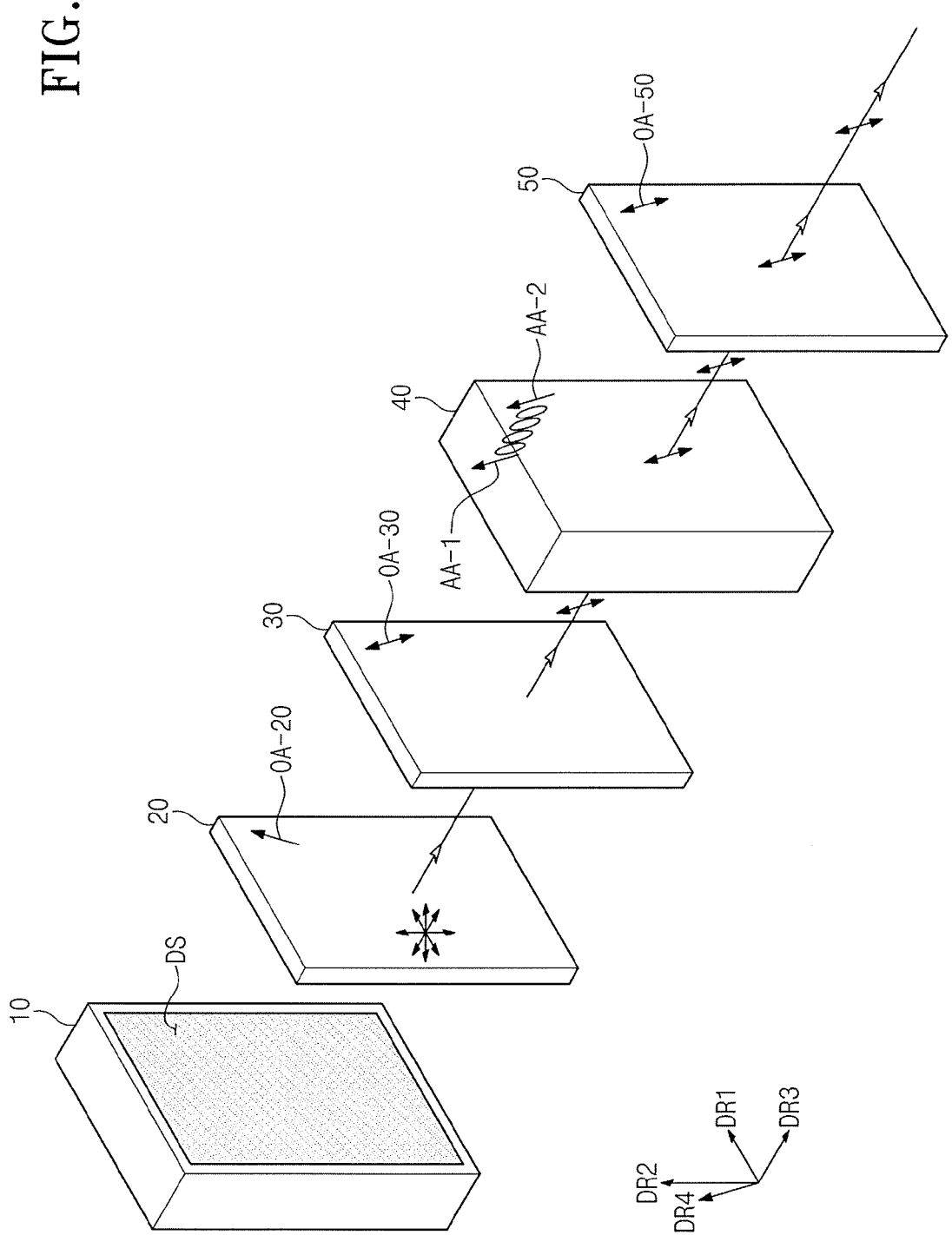
FIG. 1 is an exploded perspective view showing a display device according to an exemplary embodiment of the present inventive concept.
Figure 2:
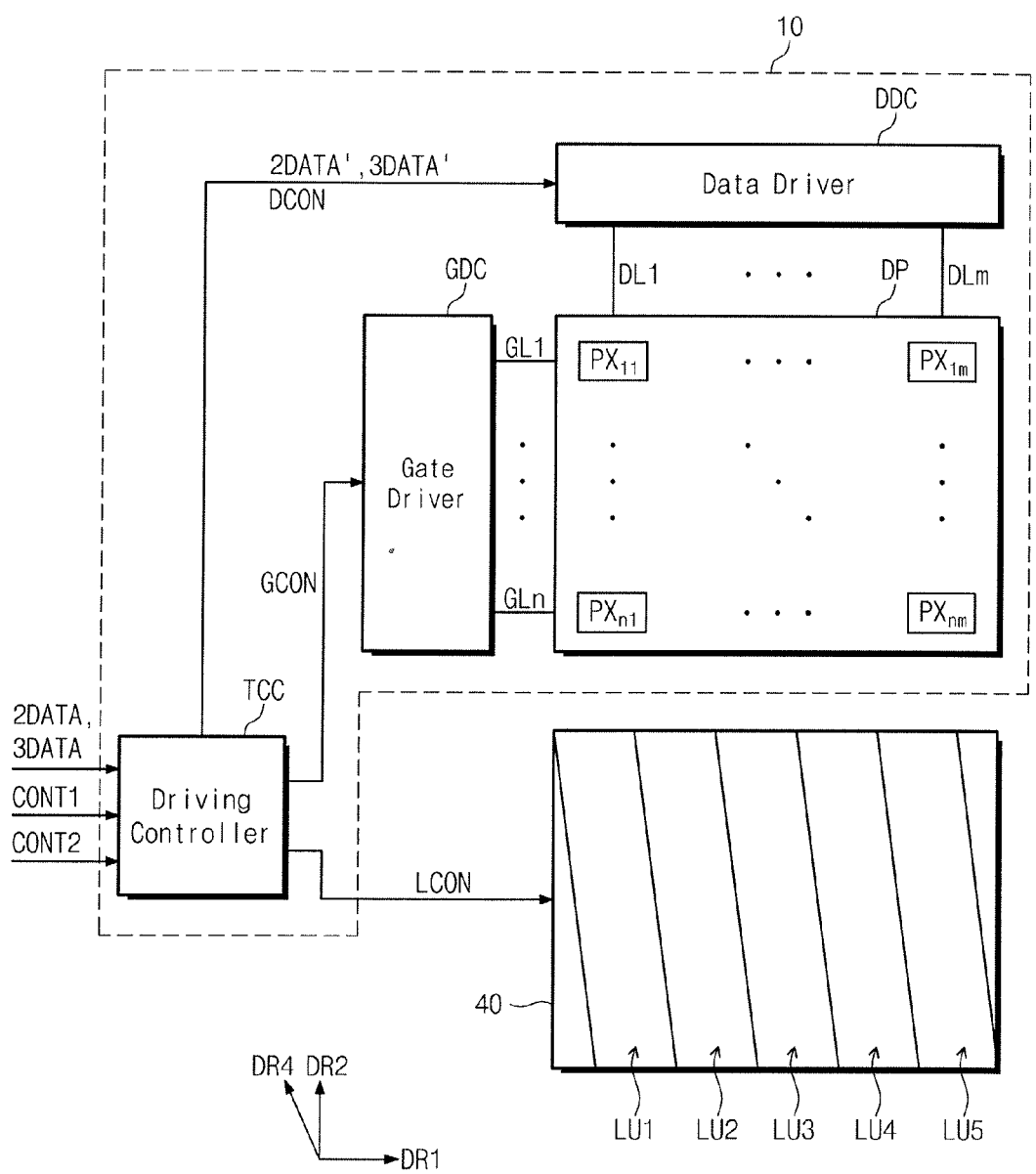
FIG. 2 is a block diagram showing a display device according to an exemplary embodiment of the present inventive concept.

FIG. 1 is an exploded perspective view showing a display device according to an exemplary embodiment of the present inventive concept and FIG. 2 is a block diagram showing a display device according to an exemplary embodiment of the present inventive concept.

Referring to FIG. 1, the display device includes a display panel 10 that generates an image, a phase retarder 20 disposed on the display panel 10, a first polarizer 30 disposed on the phase retarder 20, a liquid crystal lens 40 disposed on the first polarizer 30, and a second polarizer 50 disposed on the liquid crystal lens 40.

The display panel 10 includes a display surface DS that is defined by sides extending in a first direction DR1 and a second direction DR2 substantially perpendicular to the first direction DR1. The display panel 10 displays a two-dimensional (2D) image in a 2D mode and displays a three-dimensional (3D) image in a 3D mode. As described later, the 3D image may be referred to as a multi-view image.

The phase retarder 20, the first polarizer 30, the liquid crystal lens 40, and the second polarizer 50 are sequentially stacked on the display surface DS along a normal line direction DR3 (hereinafter, referred to as a third direction) with respect to the display surface DS. Although not shown in FIGS. 1 and 2, other functional members may be disposed between the phase retarder 20, the first polarizer 30, the liquid crystal lens 40, and the second polarizer 50.

The phase retarder 20 has a predetermined optical axis OA-20 (hereinafter, referred to as a slow axis) to retard a light passing therethrough. The phase retarder 20 may be an optical member including a plastic film elongated in a specific direction or a liquid crystal layer cured after being arranged in a specific direction.

The first polarizer 30 and the second polarizer 50 have optical axes OA-30 and OA-50, respectively, to transmit the light in a predetermined direction. Each of the first and second polarizers 30 and 50 may be formed by allowing an iodine compound or a dichroic polarizing material to be absorbed onto a polyvinyl alcohol-based polarizing film and drawing the polyvinyl alcohol-based polarizing film in an elongation direction. Each of the first and second polarizers 30 and 50 may further include a triacetyl cellulose protective film to protect the polarizing film. In addition, each of the first and second polarizers 30 and 50 may be an optical member including the liquid crystal layer cured after being arranged in a specific direction. However, the first and second polarizers 30 and 50 are not limited thereto.

The liquid crystal lens 40 transmits the 2D image in the 2D mode without changing the phase and provides the 3D image to a first focal point and a second focal point different from the first focal point in the 3D mode. For example, the liquid crystal lens 40 separates the multi-view image (e.g., 3D image) to different focal points using a diffraction phenomenon. The first and second focal points are set to points that correspond to left and right eyes of an observer, respectively, in consideration of a distance between the display device and the observer. The liquid crystal lens 40 may provide the image to a plurality of first focal points and a plurality of second focal points by considering left and right positions of the observer with respect to the display device.

For example, the liquid crystal lens 40 includes a liquid crystal layer disposed between two substrates disposed to be spaced apart from each other. Liquid crystal molecules of the liquid crystal layer are aligned along a first alignment axis AA-1 and a second alignment axis AA-2 that are defined, respectively, in the two substrates. When an electric field is applied to the liquid crystal layer, the arrangement of the liquid crystal molecules of the liquid crystal layer is changed to allow the liquid crystal layer to serve as a lenticular lens or a switch Fresnel zone plate lens.

Hereinafter, a driving method of the display device will be described in detail with reference to FIG. 2.

Referring to FIG. 2, the display panel 10 includes a display part DP, a driving controller TCC, a gate driver GDC, and a data driver DDC. The liquid crystal lens 40 includes a plurality of lens units LU1 to LU5. Five lens units LU1 to LU5 in the liquid crystal lens 40 are illustrated in FIG. 2, however, the number of lens units is not limited thereto.

The display part DP includes a plurality of gate lines GL1 to GLn and a plurality of data lines DL1 to DLm crossing the gate lines GL1 to GLn. The gate lines GL1 to GLn extend in the first direction DR1 and are arranged in the second direction DR2. In addition, the display part DP includes a plurality of pixels PX11 to PXnm. Each of the pixels PX11 to PXnm is connected to a corresponding gate line of the gate lines GL1 to GLn and a corresponding data line of the data lines DL1 to DLm. The pixels PX11 to PXnm are grouped into a plurality of pixel columns, each of which includes a plurality of pixels in a column and extends in the first direction DR1. Thus, the pixels PX11 to PXnm are grouped into m pixel columns. A portion of the m pixel columns is overlapped with a corresponding lens unit of the lens units LU1 to LU5.

The driving controller TCC receives image signals 2DATA and 3DATA. The image signals 2DATA and 3DATA may be a 2D image signal 2DATA and a 3D image data 3DATA, respectively. When the display device is operated in the 2D mode, the driving controller TCC receives a first control signal CON1. When the display device is operated in the 3D mode, the driving controller TCC receives a second control signal CON2. For instance, each of the first and second control signals CON1 and CON2 includes a horizontal synchronization signal, a vertical synchronization signal, a main clock signal, a data enable signal, or the like.

The driving controller TCC converts a data format of the image signals 2DATA and 3DATA to a data format appropriate to an interface between the data driver DDC and the driving controller TCC and applies the converted image signals 2DATA' and 3DATA' to the data driver DDC. In addition, the driving controller TCC applies a data control signal DCON to the data driver DDC and applies a gate control signal GCON to the gate driver GDC. The data control signal DCON may include an output start signal, a horizontal start signal, a horizontal clock signal, a polarity inversion signal, or the like. The gate control signal GCON may include a vertical start signal, a vertical clock signal, a vertical clock bar signal, or the like.

The gate driver GDC sequentially applies gate voltages to the gate lines GL1 to GLn. The data driver DDC outputs data voltages corresponding to the image signals 2DATA' and 3DATA' in response to the data control signal DCON.

The driving controller TCC applies a liquid crystal lens control signal LCON to the liquid crystal lens 40. The liquid crystal lens 40 is turned on or off in response to the liquid crystal lens control signal LCON. The liquid crystal lens 40 applies the electric field to the liquid crystal layer in response to the liquid crystal lens control signal LCON.

Each of the lens units LU1 to LU5 has a shape that extends in a fourth direction DR4 crossing the second direction DR2 in which the data lines DL1 to DLm or the pixel columns extend. The fourth direction DR4 is a direction having an included angle, e.g., an acute angle, to the second direction DR2.

Figure 3:
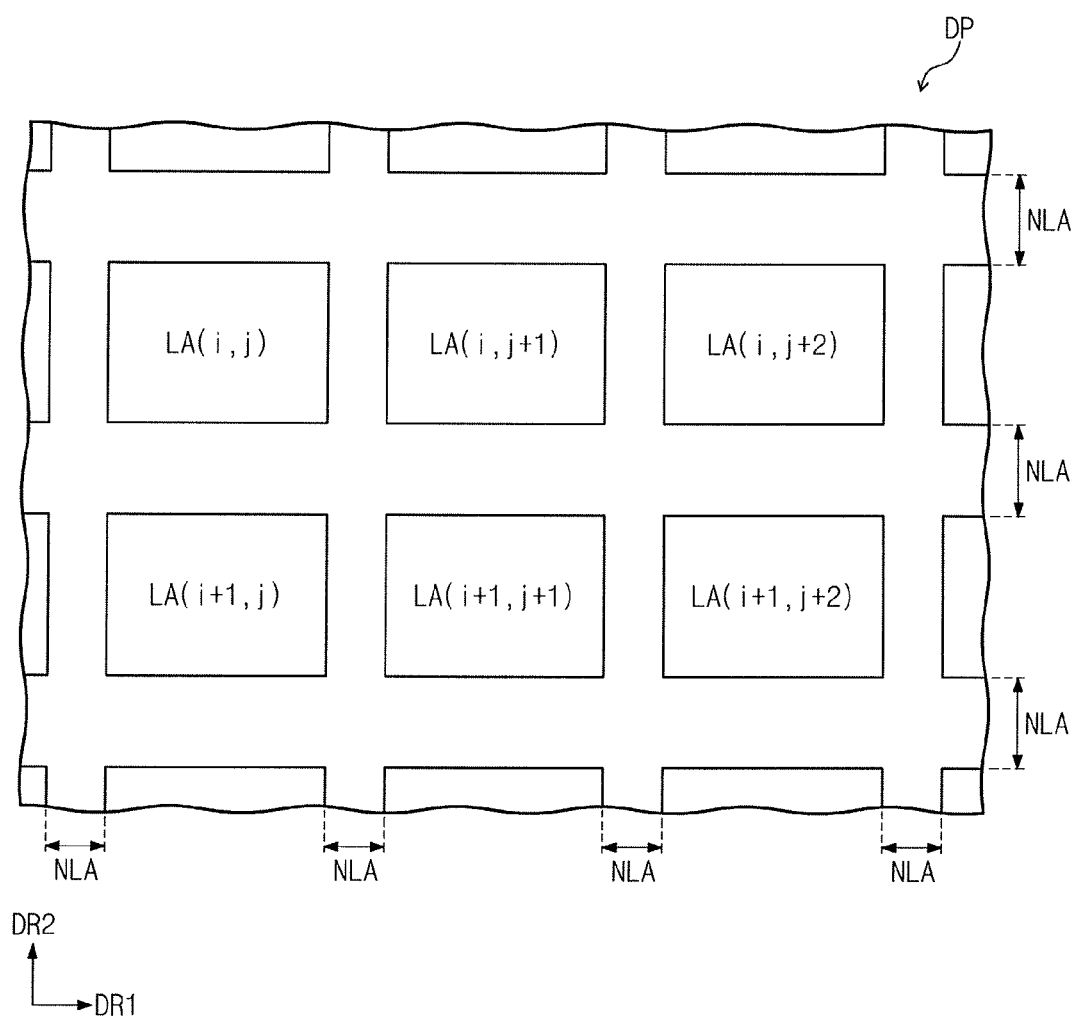
FIG. 3 is a plan view showing a display part according to an exemplary embodiment of the present inventive concept.
Figure 4:
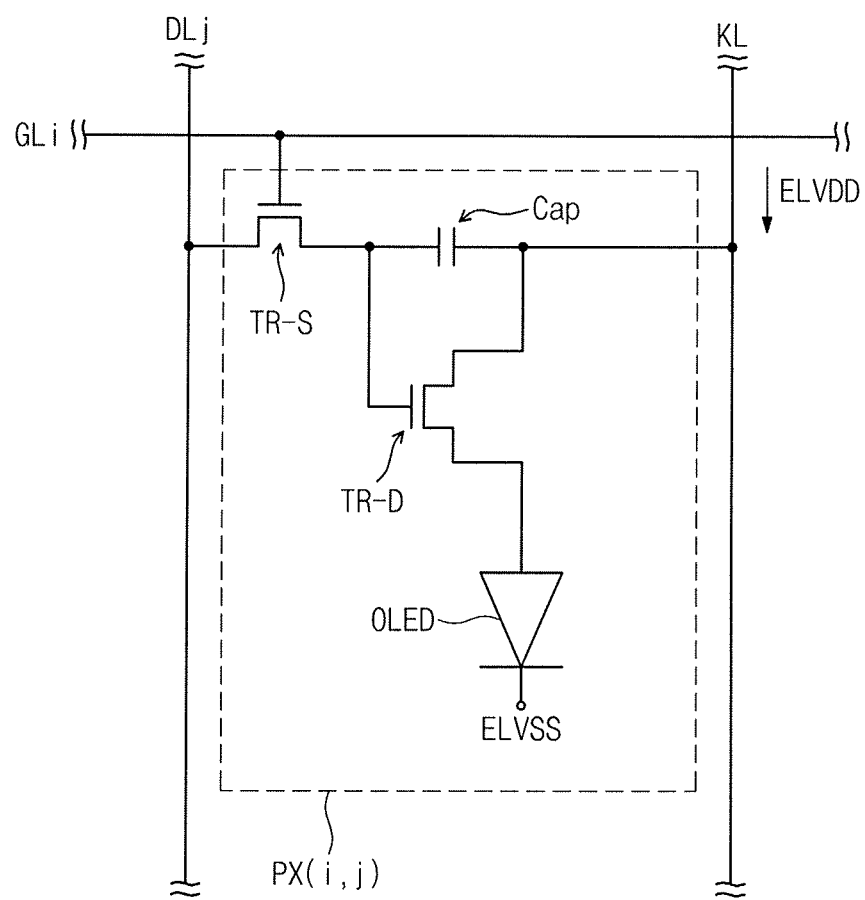
FIG. 4 is an equivalent circuit diagram showing a pixel according to an exemplary embodiment of the present inventive concept.
Figure 5:
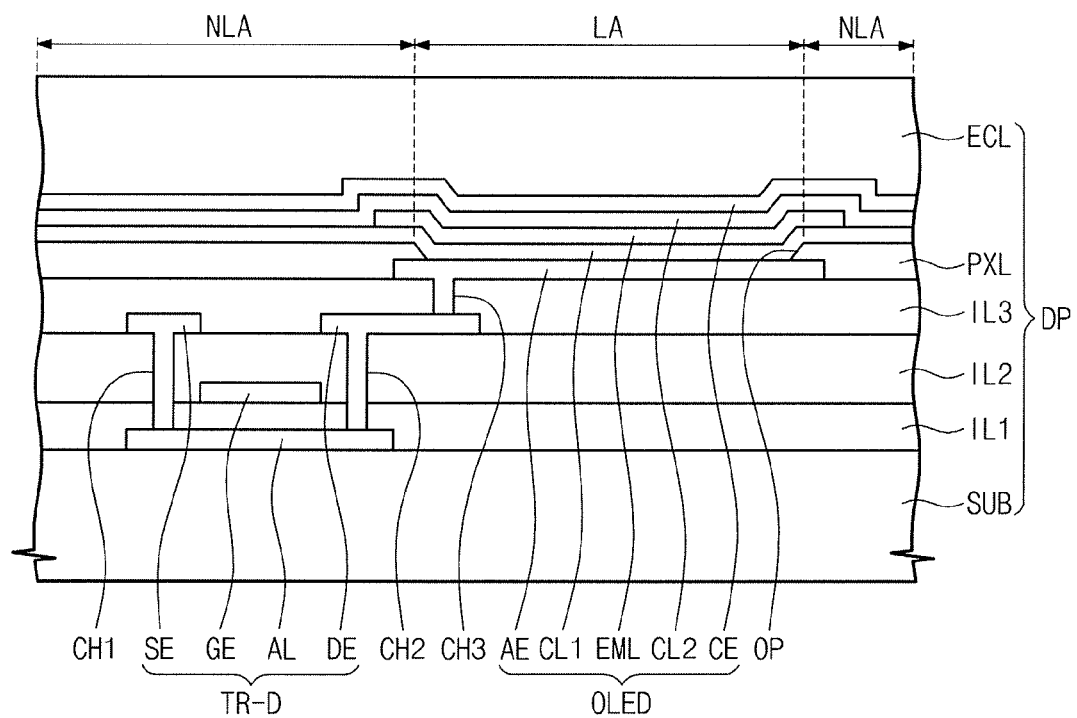
FIG. 5 is a cross-sectional view showing a pixel according to an exemplary embodiment of the present inventive concept.

FIG. 3 is a plan view showing a display part according to an exemplary embodiment of the present inventive concept, FIG. 4 is an equivalent circuit diagram showing a pixel according to an exemplary embodiment of the present inventive concept, and FIG. 5 is a cross-sectional view showing a pixel according to an exemplary embodiment of the present inventive concept. FIG. 5 shows the cross section corresponding to a portion of the equivalent circuit shown in FIG. 4.

Hereinafter, a display part according to an exemplary embodiment of the present inventive concept will be described in detail with reference to FIGS. 3 to 5. FIGS. 3 to 5 show an organic light emitting display panel as a representative example. According to an exemplary embodiment of the present inventive concept, the display device may include a self-emissive type display panel, e.g., a plasma display panel.

Referring to FIG. 3, the display surface DS includes a plurality of light emitting areas LA(i, j) to LA(i+1, j+2) and a non-light emitting area NLA surrounding the light emitting areas LA(i, j) to LA(i+1, j+2). For example, FIG. 3 shows six light emitting areas LA(i, j) to LA(i+1, j+2).

When viewed in a plan view, organic light emitting diodes (not shown) may be disposed to overlap with the light emitting areas LA(i, j) to LA(i+1, j+2). A circuit part (not shown) used to control the light emitting diodes may be disposed to overlap with the non-light emitting area NLA when viewed in a plan view. In addition, the signal lines are disposed to overlap with the non-light emitting area NLA.

FIG. 4 shows the equivalent circuit of the pixel PX(i, j). The pixel PX(i, j) receives a gate signal from an i-th gate line zGLi and a data signal from a j-th data line DLj. The pixel PX(i, j) receives a first source voltage ELVDD from a source voltage line KL.

The pixel PX(i, j) includes a switching thin film transistor TR-S, a driving thin film transistor TR-D, and a capacitor Cap that belong to a circuit part to drive an organic light emitting diode OLED. However, configuration of the circuit part is not limited thereto.

The switching thin film transistor TR-S outputs the data signal applied to the j-th data line DLj in response to the gate signal applied to the i-th gate line GLi. The capacitor Cap is charged with a voltage corresponding to the data signal provided from the switching thin film transistor TR-S.

The driving thin film transistor TR-D is connected to the organic light emitting diode OLED. The driving thin film transistor TR-D controls a driving current that flows through the organic light emitting diode OLED in accordance with an amount of electric charges charged in the capacitor Cap. The organic light emitting diode OLED emits light during a turn-on period of the driving thin film transistor TR-D.

As shown in FIG. 5, insulating layers IL1, IL2, and IL3, the driving thin film transistor TR-D, and the organic light emitting diode OLED are disposed on a base substrate SUB.

The base substrate SUB may be a glass substrate or a plastic substrate. A semiconductor pattern AL of the driving thin film transistor TR-D is disposed on the base substrate SUB. The first insulating layer IL1 is disposed on the base substrate SUB to cover the semiconductor pattern AL. The first insulating layer IL1 includes an organic and/or inorganic layer. The first insulating layer IL1 may include a plurality of thin film layers.

A control electrode GE of the driving thin film transistor TR-D is disposed on the first insulating layer IL1. A second insulating layer IL2 is disposed on the first insulating layer IL1 to cover the control electrode GE. The second insulating layer IL2 includes an organic and/or inorganic layer. The second insulating layer IL2 may include a plurality of thin film layers.

An input electrode SE and an output electrode DE of the driving thin film transistor TR-D are disposed on the second insulating layer IL2. The input electrode SE and the output electrode DE are connected to the semiconductor pattern AL, respectively, through a first contact hole CH1 and a second contact hole CH2. The first contact hole CH1 and the second contact hole CH2 are formed through the first and second insulating layers IL1 and IL2. For example, according to an exemplary embodiment of the present inventive concept, the driving thin film transistor TR-D may have a bottom gate structure.

A third insulating layer IL3 is disposed on the second insulating layer IL2 to cover the input electrode SE and the output electrode DE. The third insulating layer IL3 includes an organic and/or inorganic layer. The third insulating layer IL3 may include a plurality of thin film layers.

A pixel definition layer PXL and the organic light emitting diode OLED are disposed on the third insulating layer IL3. The organic light emitting diode OLED includes an anode AE, a first common layer CL1, an organic light emitting layer EML, a second common layer CL2, and a cathode CE, which are sequentially stacked one on another. The anode AE is connected to the output electrode DE through a third contact hole CH3 formed through the third insulating layer IL3. In accordance with a direction to which the organic light emitting diode OLED emits the light, positions of the anode AE and the cathode CE may be changed with respect to each other and positions of the first common layer CL1 and the second common layer CL2 may be changed with respect to each other.

The anode AE is disposed on the third insulating layer IL3 and exposed through an opening OP of the pixel definition layer PXL. The first common layer CL1 is disposed on the anode AE. The first common layer CL1 is disposed not only in the light emitting area LA corresponding to the opening OP but also in the non-light emitting area NLA. The first common layer CL1 includes a hole injection layer. The first common layer CL1 may further include a hole transport layer.

The organic light emitting layer EML is disposed on the first common layer CL1. The organic light emitting layer EML may be disposed only in the area corresponding to the opening OP. The second common layer CL2 is disposed on the organic light emitting layer EML. The second common layer CL2 includes an electron injection layer. The second common layer CL2 may further include an electron transport layer. The cathode CE is disposed on the second common layer CL2. The cathode CE is disposed not only in the light emitting area LA corresponding to the opening OP but also in the non-light emitting area NLA.

A sealing layer ECL is disposed on the cathode CE. The sealing layer ECL is overlapped with the light emitting area LA and the non-light emitting area NLA. The sealing layer ECL includes an organic and/or inorganic layer. According to an exemplary embodiment of the present inventive concept, a fourth insulating layer may be further disposed between the cathode CE and the sealing layer ECL. In addition, the sealing layer ECL may be replaced with a sealing substrate.

Although not shown in FIG. 5, the switching thin film transistor TR-S may have substantially the same structure as that of the driving thin film transistor TR-D. In addition, two electrodes of the capacitor Cap may be disposed on different layers of the first, second, and third insulating layers IL1, IL2, and IL3.

Figure 6:
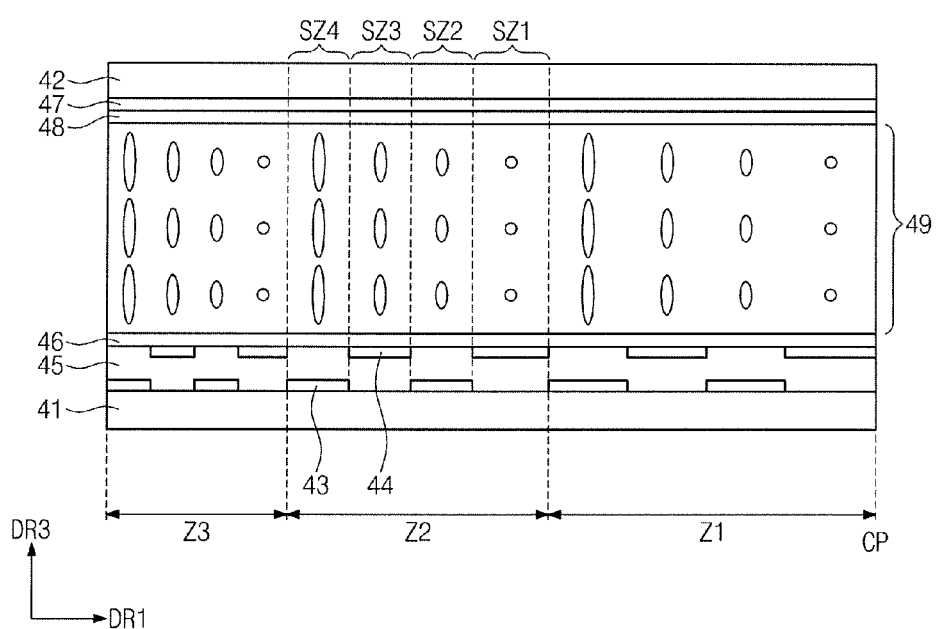
FIG. 6 is a cross-sectional view showing a liquid crystal lens according to an exemplary embodiment of the present inventive concept.
Figure 7:
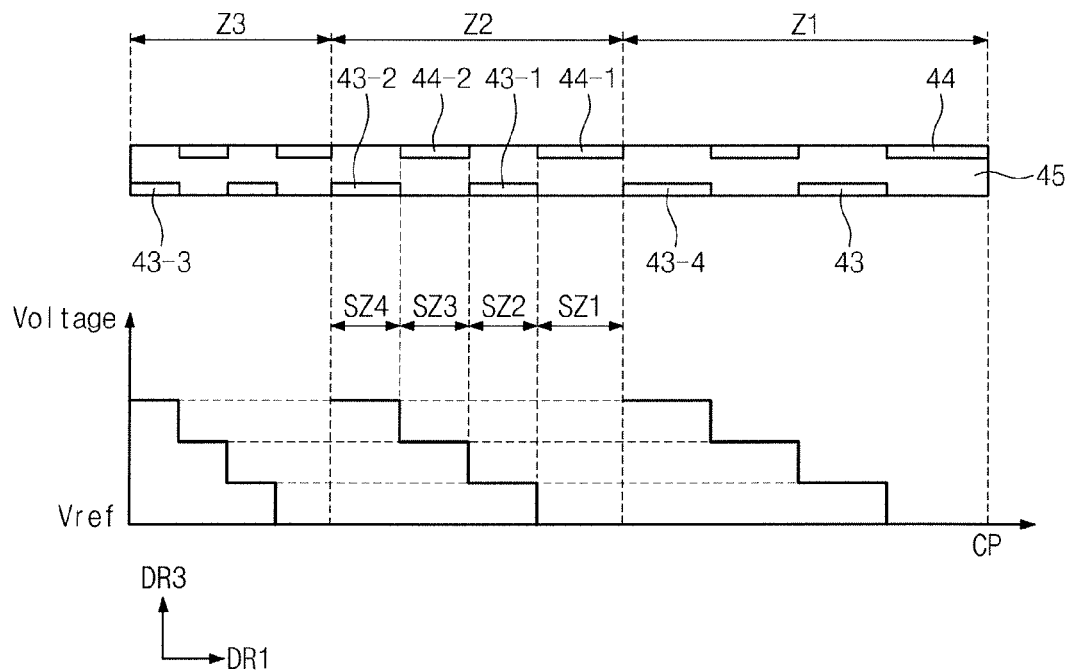
FIG. 7 is a graph showing a voltage applied to a liquid crystal lens according to an exemplary embodiment of the present inventive concept.
Figure 8:
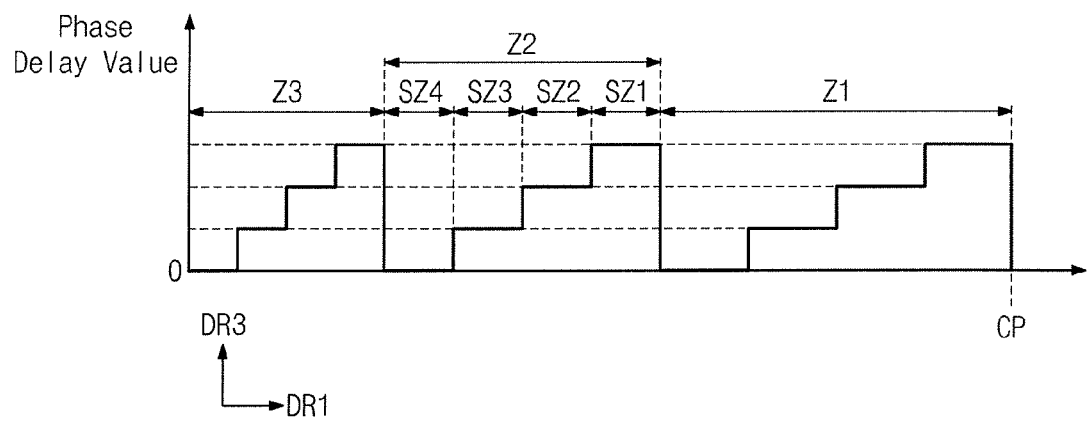
FIG. 8 is a graph showing a phase delay occurring in a liquid crystal lens in accordance with the voltage graph shown in FIG. 7.
Figure 9:
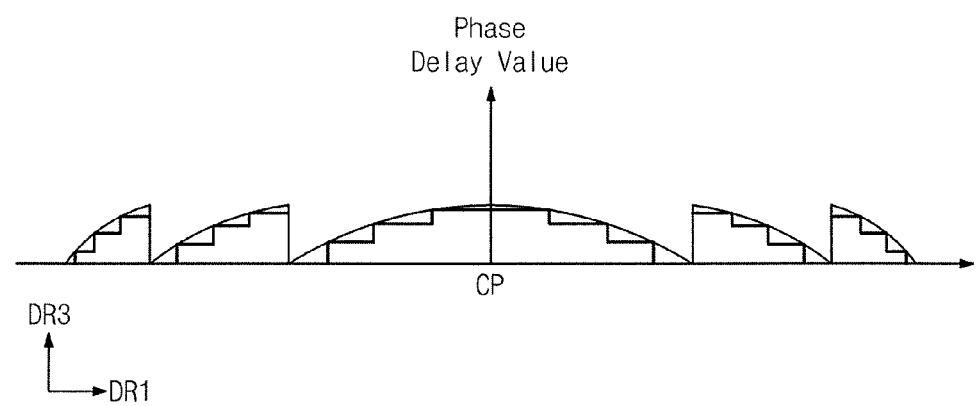
FIG. 9 is a graph showing a phase delay occurring in a lens unit according to an exemplary embodiment of the present inventive concept.

FIG. 6 is a cross-sectional view showing a liquid crystal lens according to an exemplary embodiment of the present inventive concept, FIG. 7 is a graph showing a voltage applied to a liquid crystal lens according to an exemplary embodiment of the present inventive concept, FIG. 8 is a graph showing a phase delay occurring in a liquid crystal lens in accordance with the voltage graph shown in FIG. 7, and FIG. 9 is a graph showing a phase delay occurring in a lens unit according to an exemplary embodiment of the present inventive concept.

FIG. 6 shows a portion of cross-section in the first direction DR1 of a lens unit included in the liquid crystal lens 40. The lens unit may be one of the lens units LU1 to LU5 shown in FIG. 2.

The liquid crystal lens 40 includes a plurality of first electrodes 43 and 44 disposed on a first substrate 41, a second electrode 47 disposed on a second substrate 42 disposed to be spaced apart from the first substrate 41, and a liquid crystal layer 49 disposed between the first electrodes 43 and 44 and the second electrode 47.

The first and second substrates 41 and 42 serve as a part of the liquid crystal lens 40 or a part of other optical member. Each of the first and second substrates 41 and 42 may be a glass substrate or a transparent plastic substrate.

The first electrodes 43 and 44 include lower electrodes 43 disposed on the first substrate 41 and upper electrodes 44 disposed on an insulating layer 45 that covers the lower electrodes 43. In FIG. 6, the lower electrodes 43 might not be overlapped with the upper electrodes 44, but the lower electrodes 43 are not limited thereto. For example, edge portions of the lower electrodes 43 may be overlapped with edge portions of the upper electrodes 44. In addition, according to an exemplary embodiment of the present inventive concept, the lower electrodes 43 or the upper electrodes 44 may be omitted.

The lower electrodes 43 and the upper electrodes 44 have a bar shape extending in the fourth direction DR4 (refer to FIG. 2). The second electrodes 47 are overlapped with the lower electrodes 43 and the upper electrodes 44.

The lens unit includes a plurality of areas Z1, Z2, and Z3 arranged in the first direction DR1. For instance, three areas may be arranged in each of both directions (e.g., a left direction and a right direction) with respect to a center portion CP of the lens unit in the first direction DR1. FIG. 6 shows the three areas Z1, Z2, and Z3 arranged in the left direction with respect to the center portion CP of the lens unit in the first direction DR1. Three areas Z1, Z2, and Z3 in the lens unit are illustrated in FIG. 6, however, the number of areas in the lens unit is not limited thereto.

Each of the areas Z1, Z2, and Z3 includes the same number of the lower electrodes 43 and the same number of the upper electrodes 44. A width in the first direction DR1 of the lower electrodes 43 is decreased as the lower electrodes 43 become farther from the center portion CP along the left direction. A width in the first direction DR1 of the upper electrodes 44 is decreased as the upper electrodes 44 become farther from the center portion CP along the left direction. According to an exemplary embodiment of the present inventive concept, the electrodes disposed in the same area may have substantially the same width in the first direction DR1.

Each of the areas Z1, Z2, and Z3 includes a plurality of sub-areas SZ1, SZ2, SZ3, and SZ4 arranged in the first direction DR1. Four sub-areas SZ1, SZ2, SZ3, and SZ4 in each area in the lens unit are illustrated in FIG. 6, however, the number of sub-areas in each area in the lens is not limited thereto. Each of the areas Z1, Z2, and Z3 may be divided into the sub-areas SZ1, SZ2, SZ3, and SZ4. Each of the sub areas SZ1, SZ2, SZ3, and SZ4 corresponds to each of the lower electrodes 43 or each of the upper electrodes 44 disposed therein.

The first alignment axis AA-1 is defined on the first electrodes 43 and 44 and the second alignment axis AA-2 is defined on the second electrode 47. The second alignment axis AA-2 may be substantially in parallel to the first alignment axis AA-1.

A first alignment layer 46 is disposed on the insulating layer 45 to cover the first electrodes 43 and 44. A second alignment layer 48 is disposed on the second electrode 47. The first and second alignment layers 46 and 48 may be polyimide layers that are rubbed in the same direction or an opposite direction. Alignment directions of the first and second alignment axes AA-1 and AA-2 may be defined by the rubbing direction. According to an exemplary embodiment of the present inventive concept, the liquid crystal layer may be optically aligned. In this case, the alignment directions of the first and second alignment axes AA-1 and AA-2 are determined by a direction in which light is irradiated.

During the 2D mode, the first electrodes 43 and 44 and the second electrode 47 receive substantially the same voltage. Thus, the alignment of the liquid crystal molecules included in the liquid crystal layer 49 might not be changed from its initial aligned state.

Referring to FIG. 7, in each area Z1, Z2, or Z3, the first electrodes 43 and 44 corresponding to the sub-areas SZ1, SZ2, SZ3, and SZ4 receive a step-shaped voltage in which a voltage level decreases gradually from the left side to the right side of FIG. 7. For example, in the second area Z2 of the areas Z1, Z2, and Z3, the electrode 44-1 of the first sub-area SZ1 disposed at a rightmost position receives a voltage having the lowest level and the electrode 43-2 of the fourth sub-area SZ4 disposed at a leftmost position receives a voltage having the highest level.

In addition, the sub-areas of the areas Z1, Z2, and Z3, which correspond to each other, receive the same voltage. For example, the electrodes 43-2, 43-3, and 43-4 of the first sub-areas SZ1 of the areas Z1, Z2, and Z3 may receive substantially the same voltage having the highest level.

According to an exemplary embodiment of the present inventive concept, the sub-areas of the areas Z1, Z2, and Z3, which correspond to each other, receive a voltage that gradually decreases as the sub-areas approach to the left side in the first direction DR1. For instance, the fourth sub-area SZ4 of the first area Z1 receives a higher voltage than the fourth sub-areas SZ4 of the other areas Z2 and Z3, and the fourth sub-area SZ4 of the third area Z3 receives a lower voltage than the fourth sub-areas SZ4 of the other areas Z1 and Z2.

As shown in FIG. 6, the arrangement of the liquid crystal molecules is changed in response to the electric field applied to the areas Z1, Z2, and Z3. The arrangement of the liquid crystal molecules included in the sub-areas SZ1, SZ2, SZ3, and SZ4 is changed according to the voltage applied to each of the first electrodes 43 and 44.

The arrangement of the liquid crystal molecules in the first sub-area SZ1 in each of the areas Z1, Z2, and Z3 is not changed. The liquid crystal molecules disposed in the first sub-area SZ1 are vertically aligned to the first substrate 41 and the second substrate 42.

According to the second area Z2, the liquid crystal molecules become more vertically aligned from the second sub-area SZ2 to the fourth sub-area SZ4. In addition, the liquid crystal molecules disposed in the corresponding sub-areas (e.g., SZ2 to SZ4) of the areas Z1, Z2, and Z3 become more vertically aligned as they go to the left.

The variation in the arrangement of the liquid crystal molecules causes the phase delay of the light passing through the liquid crystal lens 40. The lens unit applied with the voltage as shown in FIG. 7 may transmit the light therethrough, and thus the light has different phase delay values depending on the areas, as shown in FIG. 8. The phase delay graph according to the first direction DR1 of the lens unit is shown in FIG. 9.

The phase delay graph may be left-and-right symmetrical with regard to the center portion CP. The lens unit may serve as the Fresnel zone plate lens in the 3D mode. The phase delay value increases gradually in a step shape as a position at which the phase delay value is measured becomes closer to the center portion CP, and thus the lens unit may serve as the Fresnel zone plate of a multi-level phase modulation type.

FIG. 10 is a view showing optical axes of a display device according to an exemplary embodiment of the present inventive concept. For example, an X-axis DX is substantially parallel to the first direction DR1 in which the gate lines GL1 to GLn shown in FIG. 1 extend and a Y-axis is substantially parallel to the second direction DR2 in which the data lines DL1 to DLm shown in FIG. 1 extend.

The transmission axis OA-30 (hereinafter, referred to as a first transmission axis) of the first polarizer 30 is substantially parallel to the transmission axis OA-50 (hereinafter, referred to as a second transmission axis) of the second polarizer 50. The slow axis OA-20 of the phase retarder 20 and the first transmission axis OA-30 of the first polarizer 30 form an included angle ($\theta$) of about 45 degrees. The phase retarder 20 may be a quarter (¼) wavelength plate.

The second transmission axis OA-50, the first alignment axis AA-1, and the second alignment axis AA-2 are substantially parallel to each other. The first alignment axis AA-1 and the second alignment axis AA-2 may be substantially parallel to the fourth direction DR4 in which the lens units LU1 to LU5 extend. The first alignment axis AA-1 and the second alignment axis AA-2 form an included angle of about 90 degrees to about 160 degrees in a counter-clockwise direction of the X-axis DX.

Although the image generated in the display panel 10 passes through the phase retarder 20, the first polarizer 30, the liquid crystal lens 40, and the second polarizer 50, brightness of the image might not be reduced. As described above, since the phase variation of the image is minimized until the image is displayed to the outside, the display device may have high optical efficiency. This is because the first transmission axis OA-30, the first alignment axis AA-1, the second alignment axis AA-2, and the second transmission axis OA-50 are substantially parallel to each other.

Light (hereinafter, referred to as external light) incident to the display panel 10 from the outside of the second polarizer 50 is incident to the display panel 10 after passing through the second polarizer 50, the liquid crystal lens 40, the first polarizer 30, and the phase retarder 20.

The external light is linearly polarized while passing through the second polarizer 50. The linearly polarized light passes through the liquid crystal lens 40 and the first polarizer 30 without the phase variation. The linearly polarized incident light may be circularly polarized while passing through the phase retarder 20. The linearly polarized incident light may be left-circularly polarized or right-circularly polarized. The left- or right-circularly polarized light may be right- or left-circularly polarized after being reflected by the display panel 10. The right- or left-circularly polarized light may be linearly polarized while passing through the phase retarder 20. In this case, the linearly polarized light is polarized to a direction vertical-perpendicular to the first transmission axis OA-30. Thus, the linearly polarized light after passing through the phase retarder 20 might not pass through the first polarizer 30 and may be extinguished, since a polarized direction of the light after passing through the phase retarder 20 is vertical perpendicular to the first transmission axis OA-30 of the first polarizer 30. Thus, the external light may be prevented from being reflected and visibility of the display device may be increased.

Figure 11:
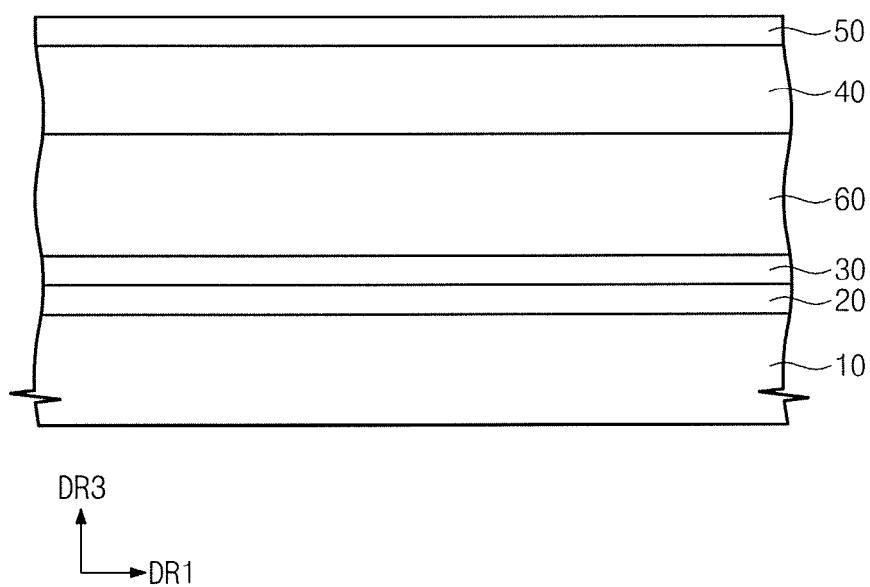
FIG. 11 is a cross-sectional view showing a display device according to an exemplary embodiment of the present inventive concept.

FIG. 11 is a cross-sectional view showing a display device according to an exemplary embodiment of the present inventive concept. In FIG. 11, detailed descriptions of the same elements as those described in FIGS. 1 to 10 will be omitted.

Referring to FIG. 11, the display device further includes a distance control layer 60 disposed between the display panel 10 and the liquid crystal lens 40. The distance control layer 60 may include a transparent member, such as a glass substrate, a plastic substrate, or the like. In addition, the distance control layer 60 may include an air gap.

The distance control layer 60 controls a focal length between the lens units LU1 to LU5 defined in the liquid crystal lens 40 and the pixel columns of the display panel 10.

Figure 12:
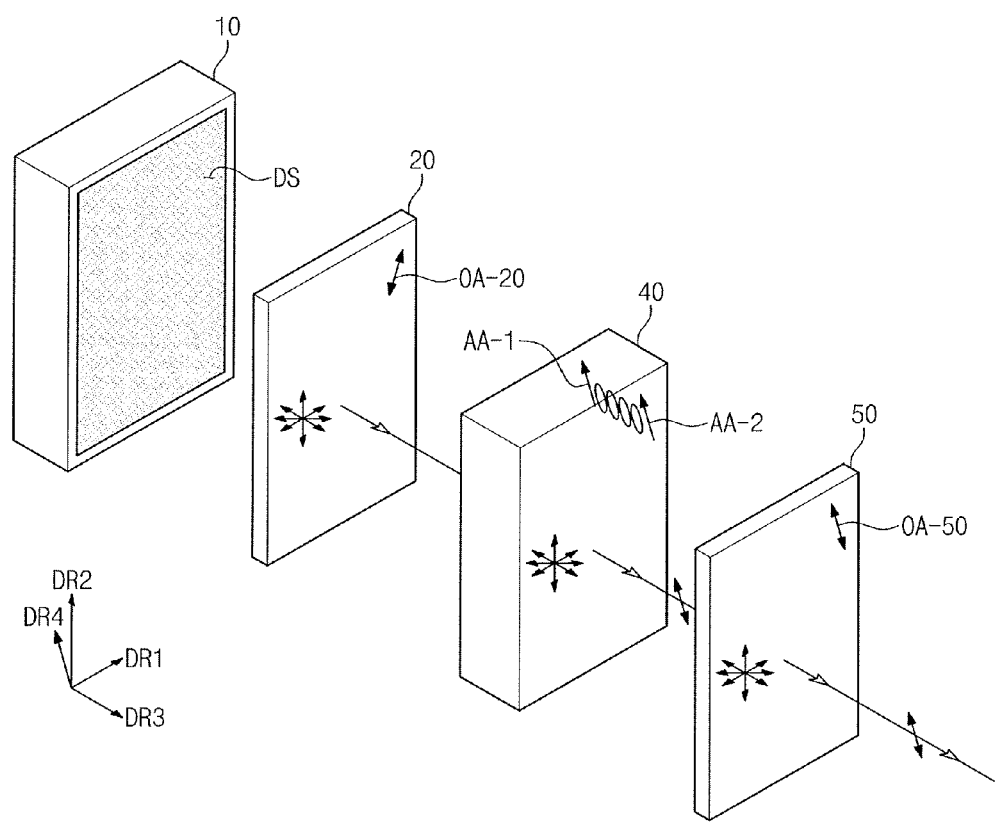
FIG. 12 is an exploded perspective view showing a display device according to an exemplary embodiment of the present inventive concept.

FIG. 12 is an exploded perspective view showing a display device according to an exemplary embodiment of the present inventive concept and FIG. 13 is a view showing optical axes of a display device according to an exemplary embodiment of the present inventive concept. In FIGS. 12 and 13, detailed descriptions of the same elements as those described in FIGS. 1 to 10 will be omitted.

The display device in FIGS. 12 and 13 may have substantially the same structure as the display device described with reference to FIGS. 1 to 10 except that the first polarizer 30 in the display device shown in FIGS. 1 to 10 is omitted in the display device in FIGS. 12 and 13. Since the first polarizer 30 is omitted from the display device, the brightness of the display device may be more enhanced. In addition, since the first polarizer 30 is omitted, a thickness of the display device may be reduced and a manufacturing cost of the display device may be reduced.

The slow axis OA-20 of the phase retarder 20 and the second transmission axis OA-50 form an included angle (θ') of about 45 degrees. The phase retarder 20 may be a quarter (¼) wavelength plate.

Although the image generated in the display panel 10 passes through the phase retarder 20, the liquid crystal lens 40, and the second polarizer 50, the brightness of the image might not be reduced. As described above, since the phase variation of the image is minimized until the image is displayed to the outside, the display device may have high optical efficiency.

Light (hereinafter, referred to as external light) incident to the display panel 10 from the outside of the second polarizer 50 is incident to the display panel 10 after passing through the second polarizer 50, the liquid crystal lens 40, and the phase retarder 20.

The external light is linearly polarized while passing through the second polarizer 50. The linearly polarized light passes through the liquid crystal lens 40 without the phase variation. The linearly polarized incident light may be circularly polarized while passing through the phase retarder 20. The linearly polarized incident light may be left-circularly polarized or right-circularly polarized. The left- or right-circularly polarized light may be right- or left-circularly polarized after being reflected by the display panel 10. The right- or left-circularly polarized light may be linearly polarized while passing through the phase retarder 20. In this case, the linearly polarized light is polarized to a direction perpendicular to the second transmission axis OA-50. Thus, the light that is linearly polarized to the direction perpendicular to the second transmission axis OA-50 might not pass through the second polarizer 50 and may be extinguished even though the light linearly polarized to the direction vertical perpendicular to the second transmission axis OA-50 passes through the liquid crystal lens 40. Thus, the external light may be prevented from being reflected and visibility of the display device may be increased.

As described above, when the image generated in the display panel is provided to the outside of the display device, loss in brightness of the image may be minimized since optical axes of the first and second polarizers in the display device are substantially parallel to each other.

In addition, when the image generated in the display panel passes through the liquid crystal lens, loss in brightness of the image may be minimized since the liquid crystal layer in the liquid crystal lens is aligned along the first alignment axis that is substantially parallel to the optical axes of the first and second polarizer.

In addition, since the external light incident from the outside of the display device is reflected and blocked by at least one polarizer and a phase retarder, visibility of the display device may be improved. Thus, optical efficiency (e.g., brightness or visibility) of the display device may be increased.

Although the present inventive concept has been described with reference to exemplary embodiments thereof, it will be understood that various modifications in form and details may be made therein without departing from the spirit and scope of the present inventive concept as defined by the following claims.

What is claimed is:

1. A display device comprising:
   a display panel configured to generate an image;
   a phase retarder disposed directly on the display panel and having a first optical axis;
   a liquid crystal lens disposed directly on the phase retarder; and
   a polarizer disposed directly on the liquid crystal lens and having a second optical axis crossing the first optical axis.

2. The display device of claim 1, wherein the first optical axis and the second optical axis form an included angle of about 45 degrees.

3. The display device of claim 2, wherein the display panel comprises a display surface having a first direction and a second direction substantially perpendicular to the first direction,
   wherein the liquid crystal lens comprises a plurality of lens units each of which extends in a third direction crossing the first direction on the display surface, and the third direction is substantially parallel to the second optical axis.

4. The display device of claim 3, wherein the display panel comprises a plurality of pixel columns extending in the first direction and arranged in the second direction, and each of the pixel columns comprises a plurality of pixels arranged in the first direction.

5. The display device of claim 3, wherein each of the lens units comprises:
   a plurality of first electrodes disposed on a first substrate and extending in the third direction;
   a second electrode disposed on a second substrate spaced apart from the first substrate; and
   a liquid crystal layer disposed between the first electrodes and the second electrode,
   wherein the liquid crystal layer is aligned along a first alignment axis of the first electrodes and a second alignment axis of the second electrode, and the second alignment axis is substantially parallel to the first alignment axis.

6. The display device of claim 5, wherein the first alignment axis is substantially parallel to the second optical axis.

7. The display device of claim 1, wherein the liquid crystal lens includes a plurality of electrodes that is substantially parallel to the second optical axis.

* * * * *